April 22, 1952
F. E. HENNING
2,594,261
EARTH AUGER WITH SPIRALLY ARRANGED
REMOVABLE CUTTING BITS
Filed Jan. 13, 1949
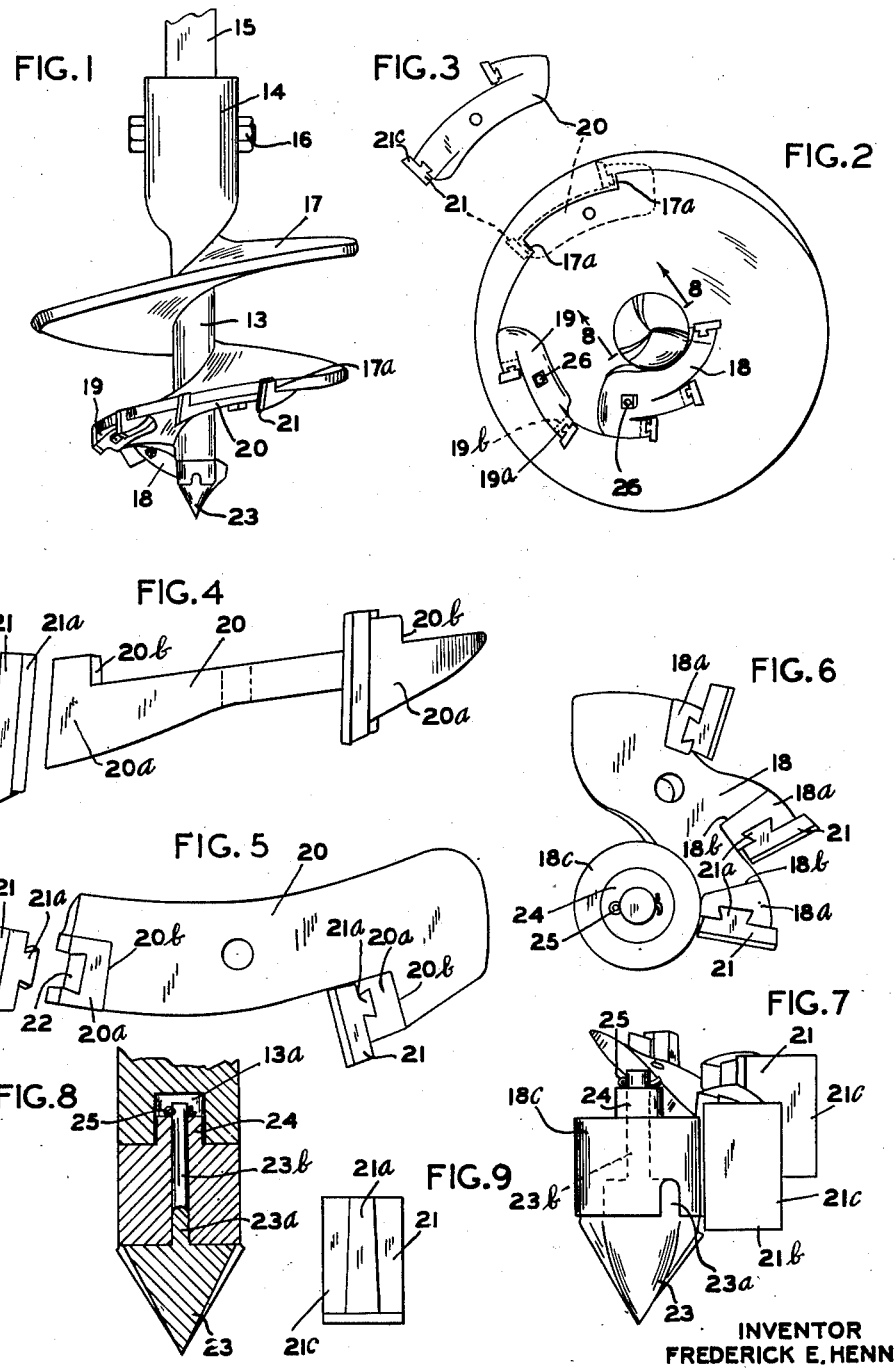
INVENTOR
FREDERICK E. HENNING
BY
*Williamson & Williamson*
ATTORNEYS Patented Apr. 22, 1952

2,594,261

UNITED STATES PATENT OFFICE 2,594,261

EARTH AUGER WITH SPIRALLY ARRANGED REMOVABLE CUTTING BITS

Frederick E. Henning, Fargo, N. Dak.

Application January 13, 1949, Serial No. 70,777

7 Claims. (Cl. 255—69)

This invention relates to an earth auger particularly designed for drilling relatively large holes in the earth to receive heavy posts and other upright members.

It is an object of my invention to provide an improved earth auger particularly adapted for drilling holes in hard and even frozen and rocky ground and to move the loosened earth upwardly during the drilling operation.

It is another object to provide a highly efficient rotary earth auger having a tapered spiral body with a plurality of peripherally spaced cutting bits mounted along the outer marginal edge portion thereof and extending outwardly therebeyond and disposed in successively increasing spaced relation to the axis of rotation of said spiral to cut zones of earth of progressively increasing diameter and to carry the loosened earth upwardly to produce a relatively large hole adapted to receive a heavy post or other upstanding member.

More specifically, it is an object to provide an earth auger adapted to drill relatively large holes in extremely hard and even frozen ground and having a generally tapered spiral body fixed around an upstanding hub adapted to be rotated and having a plurality of peripherally spaced cutting bits removably mounted along the marginal edge portion of said body and having sharpened lower and outer edge portions to cut downwardly and outwardly in successive zones of progressively increasing diameter to produce a relatively large hole.

Still more specifically, it is an object to provide an earth auger having a plurality of individually replaceable cutting bits sharpened on the bottom and outer edges and made as from extremely hard material such as "Stoody Tube Borium and Borod" to facilitate maintenance of the auger and permit relatively easy manufacture of the small cutting bits and the use of a relatively small amount of the hard cutting edge material.

It is a further object to provide a rigid spiral mounted around an upstanding hub for rotation therewith and having a plurality of spaced peripheral steps formed in the marginal edge portions thereof to receive and interlock with a plurality of cutting bits adapted to be removably mounted thereon.

These and other objects and advantages of my invention will more fully appear from the following description made in connection with the accompanying drawings wherein like reference characters refer to similar parts throughout the several views and in which:

Fig. 1 is a front elevation of my auger mounted on a rotary driving shaft;

Fig. 2 is a bottom plan view of the auger shown in Fig. 1;

Fig. 3 is a bottom plan view of a bit mounting member with the cutting bits mounted therein;

Fig. 4 is a side elevational view of a bit mounting member with one of the bits mounted therein and the other one removed therefrom;

Fig. 5 is a top plan view of the mounting member and bits shown in Fig. 4;

Fig. 6 is a top plan view of the lowermost bit mounting member with the cutting bits mounted thereon and with the earth-penetrating bottom tip also mounted thereon;

Fig. 7 is a side elevational view of the mounting member, bits, and tip shown in Fig. 6;

Fig. 8 is a fragmentary vertical sectional view taken substantially along the line 8—8 of Fig. 2 and showing in detail the connection of the earth-penetrating tip to the mounting member and the hub of rotation of the auger; and Fig. 9 is a fragmentary detail view of a cutting bit showing the tapered dovetail tenon for attaching the same to the mounting member.

As illustrated in the accompanying drawings, I provide an extremely efficient earth auger having a central elongated upstanding hub member 13 having an enlarged upper portion 14 with a polygonal socket formed therein and adapted to receive a drive shaft 15 of similar cross-sectional shape to that of the socket and adapted to be received therein for rotating the hub 13. A retaining pin such as the bolt 16 is inserted through aligned holes in the enlarged hub portion 14 and the lower end portion of the shaft 15 to securely retain the shaft in driving connection with the hub 13.

A tapered spiral body 17 is fixed around the hub 13, as best shown in Fig. 1, to form an upstanding earth-moving conveyor diminishing in radius toward the bottom thereof to substantially the relatively small radius of the hub 13. The outer marginal edge portion of the tapered spiral body 17 is stepped to form a plurality of spaced shoulders 17a adapted to receive in interlocked relation the removable bit mounting members, three of which are illustrated in the accompanying drawings and are respectively designated by the numerals 18, 19, and 20. As best shown in Figs. 4 and 5, the mounting member 20 has a pair of laterally offset longitudinally spaced thickened portions forming bit carrying heads 20a and interlocking shoulders 20b.

Each of the other mounting members shown (18 and 19) has similarly constructed bit carrying heads 18a and 19a respectively and interlocking shoulders 18b and 19b respectively formed thereon. Each of these heads 18a, 19a, and 20a has a cutting bit 21 removably secured thereto as by the tapered dovetail mortise and tenon joint, the tenon being designated by the numeral 21a and formed, in the form shown, on the rear face of the cutting bit 21. The mortise designated by the numeral 22 is formed in the forward faces of the respective heads to interfit with the respective tenons 21a. Each of the bit mounting members 18, 19 and 20 with the cutting bits 21 removably secured thereto and the interfitting means thereon all combine to form a bit assembly removably mounted on the tapered spiral body 17.

The forward cutting faces of the bits 21 are substantially flat and are disposed substantially vertically. At least the lower and outer marginal edge portions 21b and 21c are formed from relatively hard material such as "Stoody Tube Borium and Borod" and form extremely durable cutting edges for the bits. It is important that both the bottom and the outer side edges form cutting edges of the cutters 21. A ground-penetrating point 23 is removably mounted in the bottom of mounting member 18 which has a cylindrical boss 18c and has a vertically disposed passage centrally positioned therein with a transverse keyway extending thereacross at the bottom of said boss. The removable point 23 has an upwardly projecting key 23a adapted to fit into the keyway and an upstanding attachment pin 23b with a transverse aperture through the upper portion thereof extending upwardly from said key. An annular retaining member 24 is mounted over the upwardly extending portion of the pin 23b, and a suitable locking member such as the cotter key 25 retains the pin 23b and the point 23 in operating position. A central recess 13a is formed in the bottom extremity of the upstanding hub 13 to receive the annular member 24 and the upstanding portion of the pin 23b, as best shown in Fig. 8.

The connection of the cutting bits 21 to the respective mounting members 18, 19 and 20 is made by inserting the dovetail tenons respectively into the dovetail mortises, the taper of the two cooperating members securely wedging the bits 21 in cutting position on the respective mounting members. A blow with a hammer will be sufficient to fix the bits in position and likewise to remove the same for replacement. The mounting members 18, 19 and 20 are each secured to the periphery of the spiral body as by a single attachment bolt 26 with the respective shoulders 18b, 19b, and 20b interfitted with the spaced shoulders 17a of the spiral body 17. The auger itself is rigidly connected to the drive shaft as by the bolt 16, and the sharpened earth-penetrating point 23 is connected as previously described by the cotter key and the annular retaining member 24.

The following is a description of the operation of my improved earth-drilling auger. With the point 23, cutting bits 21, and mounting members 18, 19 and 20 secured to the spiral body 17 and the hub 13 secured to the shaft 15, which is driven by a suitable source of rotary driving power (not shown) my auger is assembled for operation. When the drilling operation is begun, downward pressure is exerted on the earth-penetrating point 23 to force the same into the ground until the lowermost cutting bit 21 engages the ground to begin loosening the earth immediately adjacent the hub and point 23. The next cutting bit being disposed slightly upwardly and slightly outwardly engages the next cutting zone after the first bit has drilled a slight distance into the ground, and the other cutting bits mounted on the tapered spiral body 17 successively engage drilling zones of progressively increasing diameter as the auger is forced into the earth. As the ground is loosened by the lower cutting edges 21b and outer cutting edges 21c of the cutting bits 21, it is forced upwardly onto the spiral body 17 which carries this loosened dirt upwardly toward the top of the hole. The stepped interlocked construction of the bit mounting members with the outer marginal portion of the tapered spiral body 17 prevents shifting movement of the bits and provides an extremely rigid durable construction adapted to withstand enormous strain from drilling in extremely hard ground such as frozen and rocky soil.

It will be seen that I have provided a highly efficient extremely durable earth auger for drilling relatively large holes in extremely hard ground and which may be very easily and inexpensively maintained for efficient drilling operation by the provision of the easily replaceable cutting bits. The main portion of these bits is formed from any suitable material such as cast iron and only the cutting edge portion at the bottom and side is formed from the expensive extremely hard cutting material such as "Stoody Tube Borium and Borod." After a long period of efficient use, these bits may be easily removed from the respective mounting members by merely hitting the top portion with a hammer to loosen the tapered mortise and tenon joint and permit removal of the cutting bits for replacement thereof. Only the small cutting bit portion of the auger need be replaced, and this extremely easy means of maintaining the cutting elements of the auger is an important advantage of my device and materially reduces the cost of maintenance and speeds up repair jobs. Also, the mounting of a plurality of bits on a single mounting member which is in turn mounted as a unit in interfitted relation on the outer peripheral stepped portion of the tapered spiral evenly distributes the strain of the individual bits over the plurality of interlocked steps of the spiral body and minimizes the danger of damage to the spiral during the trailing operation even upon one of the bits striking an obstruction such as a lock or the like.

It will, of course, be understood that various changes may be made in the form, details, arrangement and proportions of the parts without departing from the scope of my invention.

What I claim is:

1. An earth auger comprising an upstanding elongated central hub adapted to be driven by a source of rotary power, a downwardly tapered spiral body mounted in a fixed relation around said hub and having a plurality of spaced bit-mounting steps formed in the peripheral edge portion of said spiral body, a plurality of bit-mounting members having similarly disposed steps formed therein to be cooperatively received in the steps of said spiral body for abutment therewith, means for removably securing said mounting members along the peripheral edge of said body, and a plurality of spaced cutting bits removably mounted on each of said mounted members, and having their cutting faces lying in generally radially disposed planes relative to the axis of rotation of said spiral.

2. An earth auger comprising a downwardly tapered, spiral body having an axial hub and having a plurality of stepped portions forming abutment shoulders providing circumferentially spaced attachment portions, a plurality of segmental bit mounting members removably affixed to the respective attachment portions of the body and having abutment shoulders for cooperatively interfitting with the abutment shoulders of said attachment portions, each of said bit mounting members having a lapping connection portion, means for connecting said lapping portion to the attachment portion of the body, a plurality of earth cutting bits affixed to each of said mounting members in spaced relation and having cutting edges disposed below said attachment portions, said bits being so arranged relative to said body that the cutting edges thereof are successively disposed at respectively upwardly increasing radii from the axis of said body to cut adjacent annular zones of progressively increased diameter.

3. An earth drilling tool comprising a spiral body having an axial hub and having a plurality of stepped portions along the peripheral edge of said spiral body, said stepped portions forming generally radial abutment shoulders, said body providing circumferentially spaced segmental attachment portions, a plurality of segmental bit mounting members removably affixed to the segmental attachment portions of the body and having abutment shoulders for cooperative engagement with the respective radial abutment shoulders of said attachment portions, means for removably attaching said bit mounting members to said attachment portions, a plurality of earth cutting bits affixed to each of said mounting members in spaced relation and having depending cutting edges extending below said attachment portions, said bits being arranged on said mounting members to position said cutting edges at progressively increasing radii from the axis of said hub.

4. An earth drilling tool comprising a spiral body having an axial hub and having a plurality of stepped portions extending inwardly from the peripheral edge of said spiral body, said stepped portions forming abutment shoulders and said body providing circumferentially spaced attachment portions respectively adjacent said stepped portions, a plurality of elongated segmental bit mounting members removably affixed to said attachment portions of the body and having relatively broad engagement surfaces adapted to conform to surfaces of said attachment portions, a plurality of earth cutting bits affixed to each of said mounting members in spaced relation and having cutting edges disposed below said attachment portions, the spacing and arrangement of said bits on a plurality of cooperatively positioned mounting members being such that the cutting edges thereof are located in successively outwardly disposed relation measured by radii from the axis of said hub to cut adjacent zones of progressively increased diameter.

5. An earth drilling tool comprising an axial hub, a material conveying body fixed to said hub and having at least portions thereof extending spirally around said hub, said body being provided with a plurality of substantially radially disposed abutment shoulders extending inwardly from the peripheral edge of said body, said body providing a plurality of segmental attachment portions adjacent said abutment shoulders, a plurality of segmental bit mounting members having connection portions engaged with the respective attachment portions of said body and having abutment shoulders for cooperatively interfitting with the abutment shoulders of said body, means for removably securing the connection portions of said segmental bit mounting members to the attachment portions of said body respectively engaged thereby, a plurality of earth cutting bits fixed to each of said mounting members in spaced relation and having cutting edges disposed below said attachment portions of said body, said attachment portions extending spirally of said hub to carry cut material upwardly in spiral courses and the cutting edges of said cutting bits being arranged relative to the axial hub of said body so that adjacent annular zones of progressively increased diameter will be cut when the tool is rotated.

6. An earth drilling tool comprising a spiral body having an axial hub and having a plurality of stepped portions extending inwardly from the peripheral edge of said spiral body, said stepped portions forming abutment shoulders and said body providing circumferentially spaced attachment portions respectively adjacent said stepped portions, a plurality of segmental bit mounting members having cooperating abutment shoulders constructed to interfit with the abutment shoulders of said attachment portions and cooperate with said attachment portions to produce a generally smoothly contoured upwardly sloping material conveying surface, a plurality of cutting bits fixed to each of said mounting members and having upwardly sloping cutting surfaces with cutting edges extending substantially radially of the axis of said body to deliver loosened dirt to said material conveying surface, said bits being arranged on cooperatively positioned mounting members so that the cutting edges are located in successively outwardly disposed relation measured radially from the axis of said body to cut adjacent zones of progressively increased diameter.

7. An earth drilling tool comprising a generally spiral body having a smaller diameter at the bottom than at the top thereof and adapted to be connected at its upper end with a source of rotary driving power and having a plurality of spaced stepped portions along the peripheral edge of said spiral body, said stepped portions forming engagement shoulders each having a generally substantially vertical engagement surface, a plurality of bit assemblies secured to said body at said steps and having complementary engagement surfaces respectively engaging the substantially vertical engagement surfaces of said engagement shoulders and each of said bit assemblies including at least one cutting bit removably mounted thereon, and means for securing said bit assemblies to said spiral body at the respective steps formed thereon, the cutting edges of said bits being disposed below the respectively adjacent portions of said body and being positioned successively upwardly at progressively increasing radii from the axis of said body.

FREDERICK E. HENNING.

REFERENCES CITED

The following references are of record in the file of this patent:

UNITED STATES PATENTS

| Number | Name | Date |
| --- | --- | --- |
| 143,535 | Sheldon | Oct. 7, 1873 |
| 187,705 | Collins | Feb. 27, 1877 |
| 357,544 | Allbright | Feb. 8, 1887 |
| 648,155 | Sherman | Apr. 24, 1900 |
| 1,075,424 | Jackson | Oct. 14, 1913 |
| 1,228,296 | Chapman | May 29, 1917 |
| 1,789,399 | Bartenbach et al. | Jan. 20, 1931 |
| 1,859,717 | Rutrle | May 24, 1932 |
| 1,997,887 | Prior | Apr. 16, 1935 |
| 2,084,239 | Bradford | June 15, 1937 |
| 2,221,680 | Parrish | Nov. 12, 1940 |
| 2,504,978 | Henning | Apr. 25, 1950 |